Nov. 24, 1970
G. R. LAWSON
3,543,141
CONTINUOUSLY VARIABLE, FULL-WAVE, PHASE-CONTROLLED
POWER CIRCUIT
Filed June 19, 1967
3 Sheets-Sheet 1
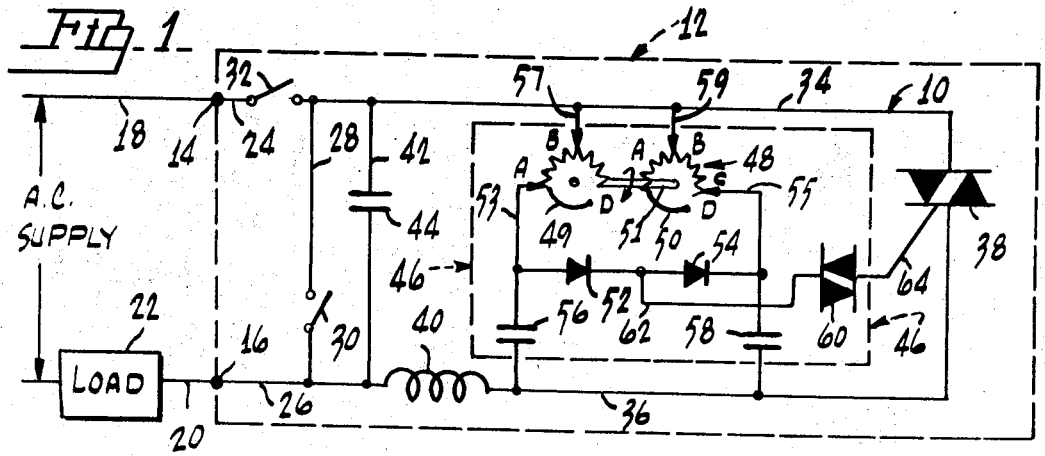
Fig. 1.
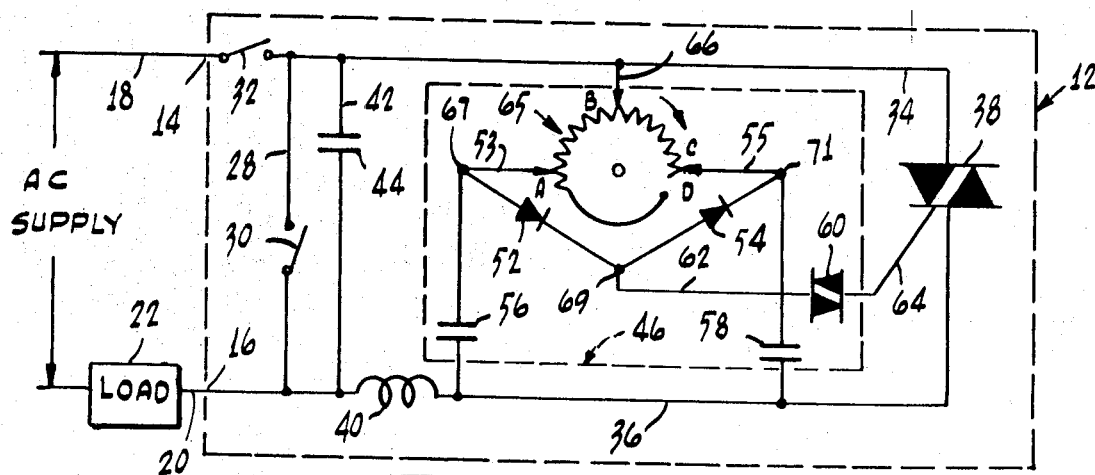
Fig. 2.
Fig. 3.
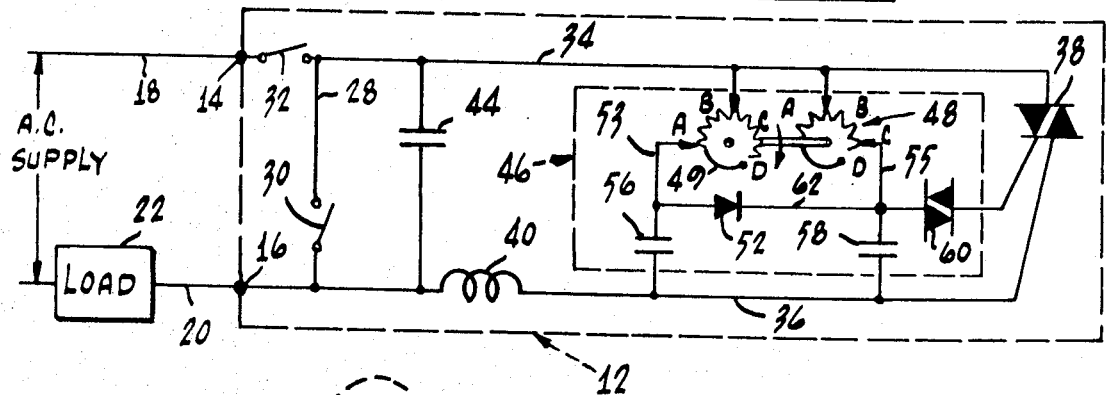
Fig. 16.
INVENTOR
GUSTAF R. LAWSON
BY Sperry and Zoda
ATTORNEYS

INVENTOR
GUSTAF R. LAWSON

BY *Sperry* and *Zoda*
ATTORNEYS

INVENTOR
GUSTAF R. LAWSON

BY Sperry and Zoda
ATTORNEYS

United States Patent Office 3,543,141
Patented Nov. 24, 1970

3,543,141
CONTINUOUSLY VARIABLE, FULL-WAVE, PHASE-CONTROLLED POWER CIRCUIT
Gustaf R. Lawson, Somerset, N.J., assignor to Circle F Industries, Inc., a corporation of New Jersey
Filed June 19, 1967, Ser. No. 647,101
Int. Cl. H02p *13/13;* H02m *5/28*
U.S. Cl. 323—24
13 Claims

ABSTRACT OF THE DISCLOSURE

A power control device includes a firing circuit controlling the firing angle of a gated symmetrical semiconductor switch during both halves of an AC cycle. The firing circuit in effect links two potentiometers for consecutive operation. One acts upon a first section or phase shifter of the firing circuit to control current flow during one half-cycle of alternating current, for adjusting the firing angle from full-off to half-power, after which the other potentiometer acts upon a second section or phase shifter (and hence on the other half-cycle) to adjust the firing angle from half- to full-power.

BACKGROUND OF THE INVENTION

Field of the invention

The invention pertains to the art of variable control of power delivered to a load from an AC source, through the provision of phase shift circuitry incorporating resistance means variable by a user to time the impression of positive and negative gate signal impulses upon a symmetrical semi-conductor switch, whereby the switch will be triggered into bidirectional conduction of current.

Description of the prior art

It is known in the art to utilize a gated bilateral solid state switch device ("triac") and an associated triggering device (diac) to control the flow of AC current in opposite directions. The gated switch is a three-terminal device for switching AC power-functionally, a pair of opposed silicon-controlled rectifiers with a common gate. It is triggered into conduction in either direction by a gate current of either polarity.

As a triggering device, there is typically employed a two-terminal AC diode that will not conduct current until the potential across it reaches a breakdown voltage, usually about 35 volts. It has symmetrical positive and negative breakover voltages, at which it changes from a very high to a negative resistance. When connected across a capacitor, this negative resistance region causes the capacitor to suddenly discharge to a lower voltage, and the discharge current is used to trigger the gated switch. Thus, it may be observed that when the breakover voltage is reached, the trigger offers a low resistance path useful in generating high speed pulses for firing SCR's or gated bilateral switches.

In the prior art, the most elementary circuit used today to fire a gated bidirectional semiconductor switch is a simple 90° phase-shifting circuit. However, such a circuit lacks stability at low power outputs and tends to amplify line voltage variations, that is, power output voltage level drops in response to a drop in the line voltage. Additionally, the firing angle increases in these circumstances, thereby further decreasing the power output. Such a circuit has the added disadvantage of suffering markedly from the hysteresis effect.

To overcome these difficulties, the art has developed an improved firing or logic circuit, in the form of a ladder phase-shifting circuit, so-called. This circuit, incorporating a phase-shifting resistance-capacitance ladder, is in common use. However, it suffers the same problems of hysteresis and voltage change amplification previously described, although to a lesser degree than is true of the 90° phase shift circuitry.

SUMMARY OF THE INVENTION

To overcome the disadvantages common to power control circuits of the character described above, I have developed phase shift circuitry in which, in a single logic or firing circuit, I incorporate two separate and distinct phase shifters, each of which comprises a variable resistance and an associated capacitor. Within the single logic circuit provided, each phase shifter is partly isolated from the other by at least one diode (preferably, two are employed). Each is also isolated for one polarity from the trigger by the diode. The net result is that one phase shift section of the network controls the gated switch for negative half-cycles of alternating current, while the other controls the gated switch for positive half-cycles. The invention permits the firing angle in each half-cycle to be controlled independently of the firing angle of the other half-cycle, in such fashion as to eliminate the hysteresis effect completely, and also reduce voltage amplification effects by more than 50%.

BRIEF DESCRIPTION OF THE DRAWING

FIG. 1 is a schematic illustration of an improved power control circuit according to the present invention, incorporating two blocking or isolating diodes;

FIG. 2 is a schematic illustration of a modified arrangement of the FIG. 1 circuit;

FIG. 3 is a schematic illustration of another form of power control circuit according to the present invention, incorporating a single blocking diode;

FIG. 16 is a view of the waveform as it appears when practicing the present invention, the power output being at "minimum on," and hence comparable in this respect to the prior art waveform of FIG. 15.

DESCRIPTION OF THE PREFERRED EMBODIMENTS

Figure 4:
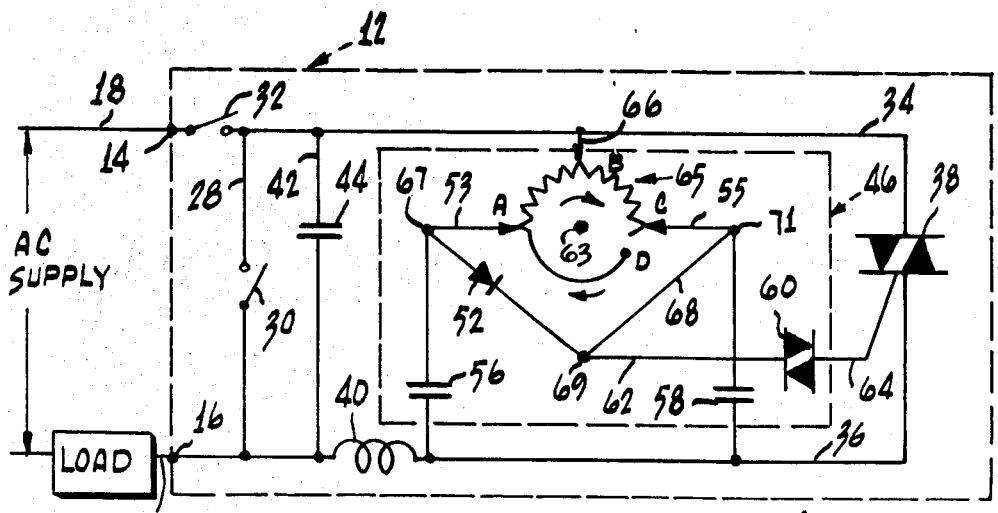
FIG. 4 is a schematic illustration showing the FIG. 3 circuit modified similarly to the FIG. 2 modification of the FIG. 1 circuit.

At 10, I have generally designated a load circuit. It may be observed at this point that the entire circuitry of the power control device constituting the present invention may be housed in an insulating housing generally designated 12 and illustrated diagrammatically in FIG. 1. The components utilized in the invention are of a size, and the circuitry is such, as to permit the housing to be sufficiently small to fit into a conventional outlet box. In these circumstances, the entire device can be substituted for the conventional general purpose on-off AC wall switch typically mounted in outlet boxes in residential or commercial construction.

When the device is mounted in an outlet box in substitution for a conventional, general purpose wall switch, it would typically be wired into one side of the house circuit, since the conductors of the house circuit that extend into said outlet box will most generally be the conductors of one side of the circuit. The power control device according to the present invention, thus, has terminals 14, 16, which can be screw terminals or any other well known terminals used in commercial or house wiring. The terminals would be accessible in the usual manner to permit connection of the conductors 18, 20 of one side of the house circuit thereto.

Controlled by the device would be the load 22. Said load could be one or more incandescent lamps connected in parallel, a motor, or any of various other fixtures or appliances with which a circuit of the type illustrated can be advantageously empoloyed. Normally, said load would be supplied with full power from a conventional AC supply, such as the 110/120 volt, 60-cycle alternating current used in a typical house supply.

Connected to terminals 14, 16 are leads or other electrically conductive elements 24, 26 providing a path for current flowing into and out of the load circuit.

In shunt across the load circuit is an electrical connection 28, in which is provided a single pole, on-off switch 30. Between connection 28 and one of the connecting terminals (in this case, but not necessarily, terminal 14) is another single pole, on-off switch 32. Switch 32 is in series connection in one side 34 of the load circuit, the other side of said circuit being designated 36. Side 34 of the circuit is connected to one terminal of a three-electrode, bi-directional, semiconductor switch 38 (generically termed "triac" in the art) while side 36 of the circuit is connected to an opposed terminal or electrode of said switch. The switch 38, in fact, can be considered as the means separating the respective sides of the load circuit 10, that is, one side of the load circuit would be the flow path between the AC current source and switch 38, while the other side of the circuit may be defined as the flow path between switch 38 and load 22 controlled thereby.

Switch 32 is thus a main switch, that is, the entire power control device is off, regardless of the position of the variable resistance means incorporated therein, the current condition of the phase shifter means, etc. With switch 32 open, the circuit including the AC source, switch device 38, and load is open. In order to permit power to flow to the load, whether full power or something less, switch 32 must be closed. Means accessible to a user, exteriorly of the housing, would of course be provided for operation of switch 32.

Means accessible to a user exteriorly of the housing would also be provided for operating switch 30. Switch 30, if left open with switch 32 closed, puts the device in condition for variable control of power for load 22 through the load circuit incorporating switch 38. With switch 32 closed and switch 30 also closed, however, load 22 will be supplied with full power only, and regardless of the condition or setting of the power control circuit of variable characteristics, there will be a full supply of power directly through shunt 28 between the AC supply and the load.

It may be observed at this juncture that switch 30, and switch 32, are illustrated to show an arrangement that would be incorporated in a typical commercial embodiment of the invention. Requirements of the Underwriters' Laboratories are such that a main control switch such as shown at 32 would be required, and in addition, a switch shown at 30 is desirable to permit the user to switch the device instantaneously between full-on and any lower power setting to which it may have been adjusted.

However, since the infinitely variable power control circuit to be described hereinafter permits a setting anywhere between full-on and full-off, it is worth noting that full-wave control of the device is possible even with switches 30 and 32 omitted.

Considering now the details of the load circuit and of the phase shift circuitry associated therewith, I provide, preferably, a choke 40. This would be provided in a commercial embodiment of the invention for RF suppression purposes, but so far as operation of the inventive circuitry itself is concerned, it is important to note that RF suppression is not critical, and the invention will function for its intended purpose with or without the same.

Also desirable, but again not critical to successful operation of the invention, is a shunt connection 42 between the opposite sides 34, 36 of the circuit, in which is connected a capacitor 44.

Designated generally at 46 is the logic or firing circuit of the present invention. This includes, in the FIG. 1 form of the device, a potentiometer or variable resistance means generally designated 48. In accordance with the invention, this is, functionally speaking, a pair of potentiometers linked for consecutive operation, whereby both are operated by a user through a single operating stem, handle, or knob, in such fashion that there is a consecutive or following operation of the two resistances. The potentiometer shown in my Pat. No. 3,464,050 dated Aug. 26, 1969, may be used to advantage.

Thus, assuming the device to be in an "off" (full resistance condition), on continuous rotation or other operation of the control stem by a user from one to the other of its extreme positions, a first potentiometer or variable resistance will be adjusted from a full resistance setting to a no-resistance condition, while the other remains at its full resistance. Then, with the first resistance retained at its no-resistance setting, the second resistance comes into play. Continued operation of the control stem by the user thus adjusts the second resistance or potentiometer section from a full resistance setting to a no-resistance setting.

The potentiometer sections, mechanically linked as described above for operation in consecutively following order, have been designated 49, 50 in FIG. 1, and might comprise separately formed layers of discs of resistance material connected for conjoint rotation by means of a single stem or shaft 51, rotatable by a user from a location exteriorly of the housing.

The input terminal of a blocking diode 52 is electrically connected to one wiper contact 53 of the potentiometer section 49. The output terminal of a second blocking diode 54 is similarly connected to one wiper contact 55 of resistance section 48. The output of diode 52 is connected to the input terminal of diode 54. Connected between side 36 of load circuit 10 and the connection that extends between wiper 53 and diode 52 is a first capacitor 56. A second capacitor 58 is connected between said side 36 of the circuit and the connection that extends between wiping contact 55 and diode 54.

Although the firing circuit 46 may be supplied with power from a source separate and distinct from the AC house supply, it will be convenient, in a commercial embodiment, that it be supplied with power from said AC source. Accordingly, as shown in FIG. 1, I provide connections between the AC supply and the resistance sections 49, 50, in the form of wiping contacts connected as at 57, 59, respectively to the side 34 of the load circuit.

Designated at 60 is a two-electrode, bi-directional AC diode (generally called a "diac" in the art) serving as the trigger for the switch device 38 and hence connected to the third electrode (gate terminal) of said device 38. One terminal of trigger 60 has a connection 62 to both sections of the phase shift circuitry, that is, the connection 62 is connected to the output terminal of diode 52 and to the input terminal (and hence to wiping contact 55) of diode 54.

The other terminal of the trigger 60 is connected as at 64 to the gate terminal of the switch device.

In the most recently developed forms of bi-directional or symmetrical semiconductor switches, the trigger 60 and the switch device 38 may be a unitary assembly, that is, a single device that includes the component parts and hence the functions of both the switch 38 and the trigger 60. Such a device, incorporating the bi-directional switch and its associated trigger, has been generically termed a "quadrac." Such a device, of course, can be substituted directly in the illustrated circuitry for the device 38 and trigger 60 illustrated.

FIG. 2 is a modified form of the circuit shown in FIG. 1. Actually, FIG. 2 is modified only very slightly, and functionally, is identical with FIG. 1. All components are the same as in FIG. 1, and in their same relationship, except that instead of a pair of individual resistances or potentiometer discs linked for joint operation, a single disc is used. In this form, which is the presently preferred form, the potentiometer has been generally designated 65, is of circular form, and is rotated by a user through the provision of a shaft 63 projecting exteriorly of the housing. The arrows in FIG. 4, showing the direction of rotation of the potentiometer section, indicate the direction in which the potentiometer is turned from a full-off (high resistance) position to a full-on position. Obviously, when it has reached the full-on position, it would be turned in a reverse direction (counter-clockwise in FIG. 4) back to its full-off position. The same is true of the directional arrows showing the potentiometer rotation direction in FIG. 1.

In any event, the potentiometer 65 has a continuous resistance section, extending through slightly more than 180°. The remainder of the potentiometer circumference is taken up by a low resistance part permitting free flow of current devoid of significant resistance. Each of the potentiometer sections 49, 50, in FIG. 1, similarly, is fashioned with a resistance section extending substantially 180°, and a low or medium resistance, free conduction path extending through the remainder of the circumference of the potentiometer section 40 or 50 as the case may be.

In any event, in FIG. 2 the construction is the same as in FIG. 1, except for the provision of the single disc as shown in FIG. 2 instead of the two resistance discs of FIG. 1. Also, the physical appearance of the connections extending from wipers 53, 55 is changed somewhat, whereby the input of diode 52, the wiping contact 53, and capacitor 56 all extend to a common connecting point 67. Similarly, the output of diode 52, input of diode 54, and one terminal of trigger 60, extend to a common connecting point 69.

Also, wiping contact 55, output of diode 54, and capacitor 58, all have a common connecting point 71.

FIG. 2 will be discussed as a typical form of the device in explaining the operation thereof. As will be noted, in FIG. 2 a single connection 66 is provided between the side 34 and the single potentiometer disc utilized in FIG. 2 form.

Figure 5:
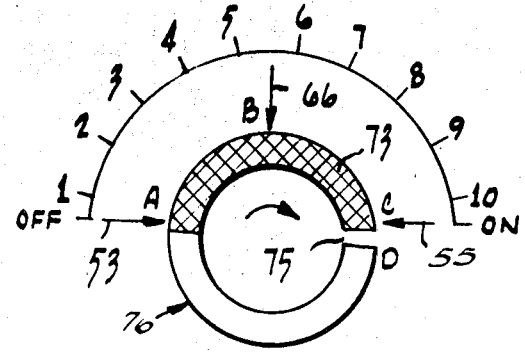
FIG. 5 is a diagrammatic representation of a potentiometer or variable resistance utilized in carrying out the present invention, shown in its full-off position.

In use, and assuming that switch 32 has been closed to permit operation of the power control device, and that switch 30 is open to allow variation of power between full-off and full-on, let it be assumed that the potentiometer 65 as shown in FIG 2 and also in FIG. 5, is initially in its full-off (high resistance) position.

Figure 6:
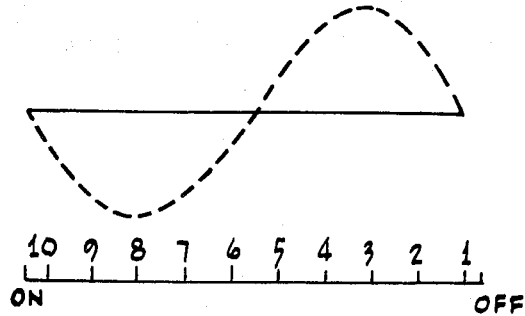
FIG. 6 is an illustration of the waveform of the load current when the potentiometer is in its full-off, FIG. 5 position.

FIGS. 5 and 6 illustrates the potentiometer condition, and waveform (actually, no wave at all) obtaining under these circumstances. Wiping contacts 53, 66 are spaced approximately 90° apart, and extending therebetween is resistance material A–B. Wiping contacts 66, 55 are also 90° apart and extending between them is resistance material B–C. In this form of the invention, the potentiometer per se, which it may be noted is the subject of a separate patent application, is in the form of a split ring. The resistance section 73 thereof extends from the split or open portion 75 of the ring through substantially 180°. The low resistance or freely conductive path or portion of the potentiometer disc (portion A–D) has been designated 76 and extends from the split to the end of the resistance section 73 remote from the split or open portion 75.

In the full-off position of the parts, wiping contacts 53, 55 are in engagement with opposite ends of the high resistance section or area 73 of the potentiometer. Wiping contact 66 is midway therebetween, that is, angularly spaced approximately 90° from contacts 53, 55 in engagement with the midpoint of high resistance area 73.

Thus, wiping contact 53 is in engagement with area 73 at one end A of said area 73, contact 66 engages area 73 at its midpoint B, and contact 55 engages at the other end C of high resistance area 73. In FIG. 5, I have illustrated, by way of facilitating understanding of the operation, a scale the opposite ends of which have been designated "off" and "on." The scale would not ordinarily be displayed on the commercial embodiment, since it shows steps or definite gradations of power when in fact the power is infinitely variable. A scale could be provided, however, if the manufacturer so desires.

In any event, the scale extends through substantially 180°, being coextensive with the area 73 when said area is in its full-off position as shown in FIG. 5. Under these circumstances, end A of high resistance area 73 is in registration with the "off" point of the 180° scale shown in FIG. 5, while the notation "on" of the scale is in registration with the other end C of the high resistance area.

Figure 7:
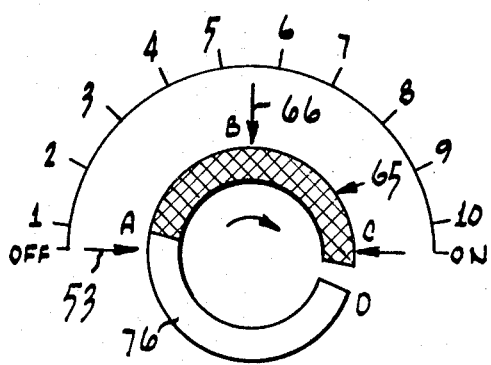
FIG. 7 is a view similar to FIG. 5 showing the potentiometer rotated to a typical low-power position (through not necessarily the lowest position possible in practicing the invention)
Figure 8:
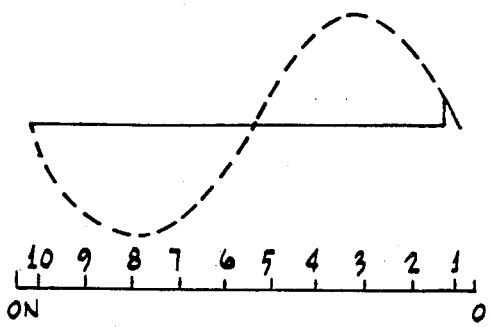
FIG. 8 is a view of the waveform of the current supplied to the load when the potentiometer is in its FIG. 7 position.

If, now, potentiometer 65 is rotated slightly, from its FIG. 5 to its FIG. 7 position, to locate point A in registration with point 1 of the scale, switch device 38 will be triggered into conduction. This occurs as follows: power is supplied through lead 34 from the source of current of the firing circuit. The current enters the variable resistance through the wiping contact 66, and passes 90° therethrough in a counterclockwise direction, viewing the same as in FIG. 7, to wiping contact 53. The current (see FIG. 2) passes through connection 67, is present at the terminal of the capacitor 56 connected at 67, and thereafter passes through diode 52, connection 69, trigger 60, and connection 64 to the gate terminal of switch device 38. As shown in FIG. 7, the path from wiping contact 66 to wiping contact 53 has been decreased slightly in resistance, being composed almost entirely of a high resistance area, but being also composed, slightly, of a low resistance area. Build-up of the firing voltage at capacitor 56 occurs until the breakover voltage (for example 30 or 35 volts) is present at trigger 60.

The phase shift circuitry including wiping contact 66, wiping contact 53, the potentiometer portion extending therebetween, capacitor 56, diode 52, and connection 62 to the trigger, comprises one phase shift section of the firing circuit, and this section is associated with one half-wave of each full cycle of alternating current. In the illustrated example, this half-wave is the positive half-wave shown in FIGS. 6, 8, 10, 12 and 14.

At step 1 (FIG. 7 position of the potentiometer), in which resistance is still high in the phase shift circuitry controlling triggering of switch 38 during said positive half-wave, the firing angle is very high.

With the potentiometer in the FIG. 7 position, it will be observed that during the negative half-wave of a single cycle of alternating current supplied to the device 38, there is no triggering of the switch 38 at all. This is due to the fact that rotation of the potentiometer 65 to the FIG. 7 position leaves an area of high resistance over the full distance between wiping contact 66 and wiping contact 55. Resistance to the passage of current between contacts 55 and 66 in the potentiometer controls the firing angle during the negative half-wave of the alternating current cycle.

Figure 9:
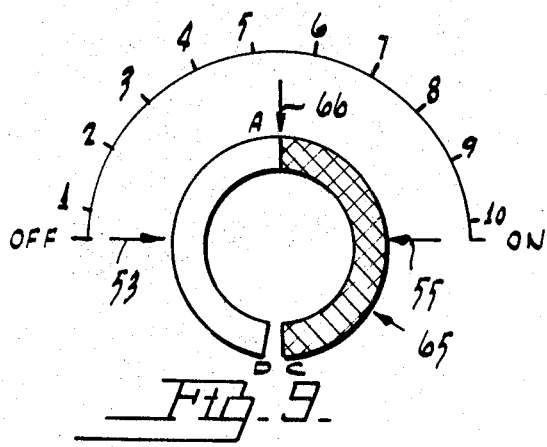
FIGS. 9 and 10 are views of the potentiometer and waveform, respectively, when the potentiometer is in its half-power position.
Figure 10:
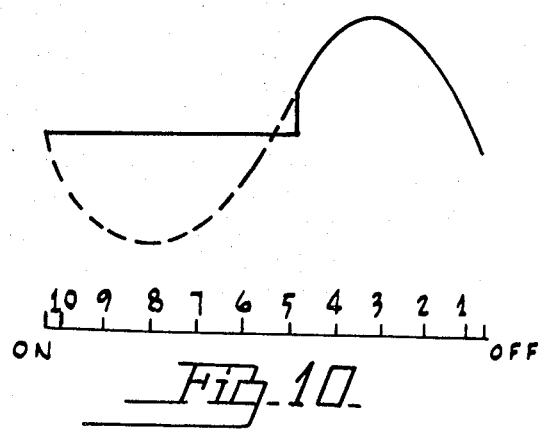

Continued rotation of the potentiometer in a clockwise direction, from its FIG. 7 position, ultimately will bring the same to a position such as shown in FIG. 9. At this time, the path between wiping contacts 66, 53 is composed entirely of a low resistance material. As a result, the phase angle of the positive half-wave has now been decreased fully through step 5, that is, for the entire length of the positive half-wave. Therefore, device 38 is now conductive through a period of time coincident with and extending over the entire length of the positive half-wave.

Nevertheless, rotation of potentiometers 65 to this position still leaves, between contacts 55 and 66, a current flow area that is composed entirely of high resistance material. Therefore, there is still no conduction whatever of device 38 during the negative half-wave time period.

Figure 11:
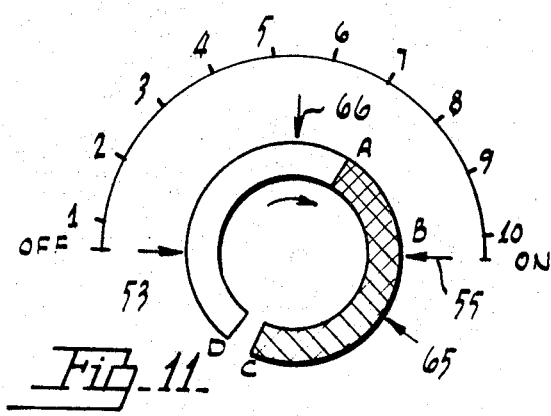
FIG. 11 and 12 are views of the potentiometer and waveform, respectively, when the potentiometer has been rotated slightly past its half-power position.

Assuming now that the potentiometer 65 has been further rotated from its FIG. 9 to its FIG. 11 position, with point A now located at a position indicated by the numeral "7" on the scale extending about the potentiometer, and also indicated by the corresponding numeral on the lineal scale indicated in association with each waveform illustration, it is seen that between wiping contacts 53, 66 there is now a path of free conduction, while between contacts 55 and 66 there is a path which is partly of high resistance material and partly of low resistance or so-called free conduction material. The ratio of high resistance to low resistance material between wipers 55, 66 is such that during each negative half-wave of current directed to the device 38, said device will be fired for a time period indicated from the end of the negative half-wave to a location indicated as step 7 in the lineal scale of FIG. 12 adjacent the waveform.

Figure 12:
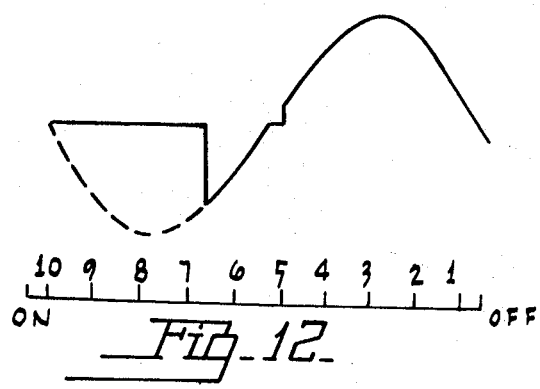

Since there is low resistance material the entire distance between wipers 53 and 66, the positive half-wave will now be full as shown in FIG. 12, that is, the switch 38 will be conducting for the entire period of the positive half-wave and for a period of time during the negative half-wave indicated as step 7 in FIG. 12. This provides slightly more than 50% power to the load.

Figure 13:
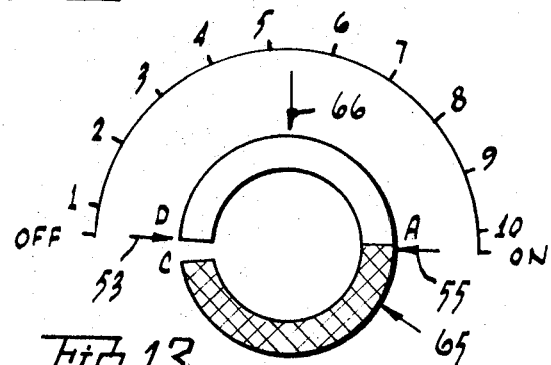
FIGS. 13 and 14 are views of the potentiometer and waveform, respectively, when the potentiometer has been rotated to its full-on position.

Further rotation of potentiometer 65 in a clockwise direction eventually brings it to its other extreme position shown in FIG. 13, in which there is a path of free conduction between the wiper 66 and both wipers 53, 55, so that the device is now in a full-on condition.

The flow of current to trigger the switch 38 during each negative half-cycle may be traced as follows:

From source of AC current through load 22, through lead 36 to connection of lead 36 to switch 38, thence through gate terminal 64, trigger 60, diode 54, to connection 71 with wiping contact 55 and capacitor 58. Voltage is stored at capacitor 58, until it reaches the breakover point at which trigger 60 conducts freely. Current flows from connection 71 in these circumstances through wiper contact 55, potentiometer 65, wiper contact 66, and lead 34 back to the source of AC supply.

According to the extent of resistance between wipers 55 and 66, the phase angle at which switch 38 will be fired by trigger 60 will be selected by the user.

In FIG. 3, the circuit is identical to that shown in FIG. 1, except that diode 54 is omitted. It has been found that the device will work efficiently, though perhaps not with as much efficiency as the FIG. 1 circuit, with a single diode rather than two diodes. The flow path of not with as much efficiency as the FIG. 1 circuit, with firing current, and current supplied through load 22, is a single diode rather than two diodes. The flow path of the same as in FIG. 1, so far as positive half-cycles are concerned. As to negative half-cycles, also, the flow path is substantially unchanged. Rectifier 52 blocks current that is used to trigger switch 38 during negative half-cycles, from flowing through the first phase shift section characterized by potentiometer section 49 and capacitor 56. Similarly, during the existense of firing current used for triggering switch 38 during negative half-cycles, rectifier 52 blocks flow in a reverse direction through the first (positive half-wave) phase shift sections.

FIG. 4 is a modification of the FIG. 3 circuit, which does for the FIG. 3 circuit the same thing that FIG. 2 does for FIG. 1, that is, it shows an adaptation of the FIG. 3 circuit, utilizing a single blocking rectifier, in which a single, split potentiometer 65 is employed. Otherwise, the construction is identical to the FIG. 3 arrangement.

The arrangement used in the present invention, as compared to the prior art, has a notable advantage, in that the firing angle in each half-cycle can be controlled independently of the firing angle in the other half-cycle. One can select an infinite variation of firing angles in a single half-cycle of the sine wave, without bringing the other half-wave into consideration at all. Then, after having reached 50% of full power, one can exercise the same amount of control through the other half-wave, selecting an infinite number of gradations of power, without regard to or effect upon the power supplied during the other half-wave. This reduces the voltage amplifying effect discussed previously herein by more than 50%.

Figure 15:
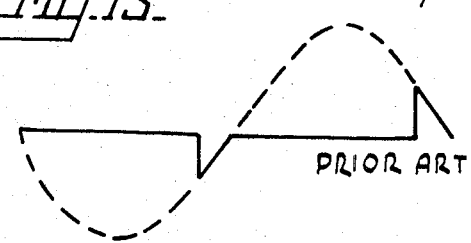
FIG. 15 is a view of the waveform of the load current as it appears when practicing the prior art, the waveform being shown as it appears at the "minimum on" power output level possible in the prior art, as developed by rotation of the pontentiometer of the prior art from an off position to a position equivalent to that shown in FIG. 7.
Figure 14:
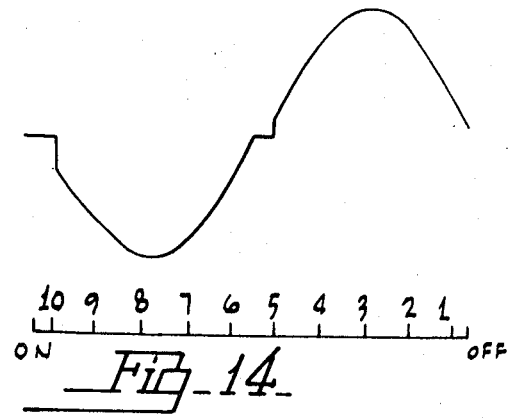

A part from reduction of voltage amplification, the invention eliminates the hysteresis effect. In this connection, FIG. 15 illustrates a waveform according to the prior art. As seen from FIG. 15, it is a characteristic of the prior art devices that turning the variable resistance from full-off, that is, a maximum resistance condition, to its minimum "on" setting, results in a firing of the switch 38 during a portion of both the positive and the negative half-waves of a single cycle. The minimum portion is designated by step 1 in FIG. 15. This is due to the so-called hysteresis effect.

In a power control circuit of the type illustrated and described herein, it is known that if the potentiometer resistance is increased to a point where the semiconductor switch 38 never conducts and then is gradually decreased, a point is reached where the switch "jumps on" to a certain power output level. This is shown in FIG. 15. The resistance can then be increased and this "minimum on" power output level can thus be decreased. If resistance is increased beyond a critical point, or if main power is momentarily interrupted, then the switch 38 will stop conducting, and must once more be manually turned on to its "minimum on" level shown in FIG. 15 before it can be adjusted to lower power levels.

It is interesting to note, in this regard, that in the ordinary house circuit, it is not uncommon for variations in voltage to occur. Often, there is a temporary voltage drop in the current supplied to homes in a particular residential section, for one reason or another. Even though this is momentary or at best over a relatively short period of time, the fact is that a load 22, which has been on "low," will go off completely. It will not come on again until the switch 38 is turned on to its "minimum on" level once again, by a user.

This is not true in practicing the present invention. The "minimum on" power output level is virtually zero, and in any case, the "turn-on" minimum power level is the same value as the "turn-off" minimum power level. This is illustrated in FIG. 16. Therefore, the switch will come back on automatically at its previous power level following any interruption of line current.

Though not illustrated herein, I propose to incorporate switches 30, 32 and potentiometers 48 or 65, in a unitary operating control projecting exteriorly of the device. As will be observed, in any position to which the potentiometer is operated, that is, in any of the positions of FIGS. 5, 7, 11, or 13, for example, the device can be turned off completely by opening switch 32. Thereafter, the device can be turned back on, at the level of operation at which it was adjusted when turned off, merely by closing switch 32. Further, in any position to which the potentiometer may be adjusted between on and off along the scale shown, the switch 30 can be closed, to turn the power full-on instaneously. Thereafter, switch 30 can be opened, and the power would immediately revert to the particular, adjusted lower setting at which it was when the switch 30 was closed.

Suitable circuit values for the various components illustrated are given by way of illustration as follows:

Switch 38—5 amps. 200 volts AC.
Capacitor 44—.047 mfd., 200 volts AC.
Choke 40—80 microhenries
Variable resistance A–B—100K
Variable resistance B–C—200K
Rectifiers 52 and 64 (each)—100 ma., 50 v.
Trigger 60, 40 v., capacitors 56, 58—.1 mfd., 200 v. AC.

I claim:
1. A circuit for full wave control of power supplied to a load, comprising:
    (a) a load circuit connected to a source of alternating current and including a symmetrical, bi-directional semiconductor switch having a gate terminal; and
    (b) a firing circuit for said switch connected between a current source and the gate terminal, and including first and second phase shifters connected to the gate terminal to control the firing angle of said switch during the first and second halves, respectively, of each cycle of alternating current supplied to the switch, said phase shifters including a pair of variable resistance means one of which is in the first and the other of which is in the second phase shifter, both said resistance means being joined for operation in a sequence in which, with both initially at a corresponding extreme limit of adjustment, first one and then the other resistance means is adjustable over its full range to its opposite extreme limit of adjustment.

2. A power control circuit as in claim 1 wherein said firing circuit includes a triggering device for said switch common to both of the phase shifters and connected between said gate terminal and the respective variable resistance means of the phase shifters.

3. A power control circuit as in claim 2, wherein said variable resistance means are in series connection between the triggering device and the source of firing circuit current.

4. A power control circuit as in claim 2 wherein the respective phase shifters include a pair of capacitors, one of which is in series connection between the load circuit and one of said variable resistance means, the other capacitor being in series connection between the load circuit and the other variable resistance means.

5. A power control circuit as in claim 2 wherein firing circuit includes means connected between the variable resistance means of said one phase shifter and the triggering device to permit the flow of firing current from the variable resistance means of said one phase shifter to the gate terminal during one half-wave of alternating current supplied to the switch, while preventing the flow of current from said gate terminal through the variable resistance means of said one phase shifter during the other half-wave of alternating current.

6. A power control circuit as in claim 1 wherein the load and firing circuits are connected to a common source of alternating current.

7. A power control circuit as in claim 6 wherein each of the first and second phase shifters extends from a connection to one side of the load circuit to a common connection to the gate terminal.

8. A power control circuit as in claim 7 wherein each of the first and second phase shifters includes a variable resistance means and a capacitor connected in series between opposite sides of the load circuit, and wherein each phase shifter includes a connection extending from a location between the series-connected variable resistance means and capacitor thereof to the common connection of the phase shifters to the gate terminal.

9. A power control circuit as in claim 8, further including a blocking rectifier in at least one phase shifter, preventing backflow of current through the variable resistance means thereof from the gate terminal.

10. A power control circuit as in claim 9, further including a triggering device for said symmetrical switch in the form of a bi-directional, two-terminal, semiconductor switch in the common connection of the respective phase shifters to the gate terminal.

11. A circuit for full wave control of power supplied to a load, comprising:
    (a) a load circuit connected to a source of alternating current and including a symmetrical, bi-directional semiconductor switch having a gate terminal; and
    (b) a firing circuit for said switch connected between a current source and the gate terminal, including
        (1) potentiometer means comprising first and second potentiometer sections each of which has one terminal connected to one side of the load circuit and its other terminal connected in series with a capacitor to the other side of the load circuit, said potentiometer sections being connected for joint operation by a user in an operating sequence requiring that with both initially at a corresponding extreme limit of adjustment, first one and thereafter, the other is adjustable over its full range to its opposite extreme limit of adjustment, said other terminals of the potentiometer sections being connected to the gate terminal of the switch, and
        (2) means in the connection between the gate terminal and one of the potentiometer sections permitting current flow therebetween in one direction only, from said one potentiometer section to the gate terminal.

12. A circuit as in claim 11 further including means in the connection between the gate terminal and the other potentiometer section also permitting current flow therebetween in one direction only, from the gate terminal to said other potentiometer section.

13. A circuit for full wave control of power supplied to a load, comprising:
    (a) a load circuit connected to a source of alternating current and including a symmetrical, bi-directional semiconductor switch having a gate terminal; and
    (b) a firing circuit for said switch connected between a current source and the gate terminal, and including first and second phase shifters connected to the gate terminal to control the firing angle of said switch during the first and second halves, respectively, of each cycle of alternating current supplied to the switch, said phase shifters including a pair of variable resistances mounted one in the first and the other in the second phase shifter, said resistances being mounted for operation by a user in a sequence in which adjustment of each resistance from one to its other extreme adjustment limit can be effected with the other resistance remaining at an extreme limit of its adjustment, whereby infinite variation of the phase angle of each half-wave of alternating current may be obtained without varying the phase angle of the other half-wave of the same current cycle.

References Cited

UNITED STATES PATENTS 3,103,618  9/1963  Slater.
3,328,678  6/1967  Slater.

J D MILLER, Primary Examiner

G. GOLDBERG, Assistant Examiner

U.S. Cl. X.R

307—305; 323—36